Patented Jan. 3, 1939

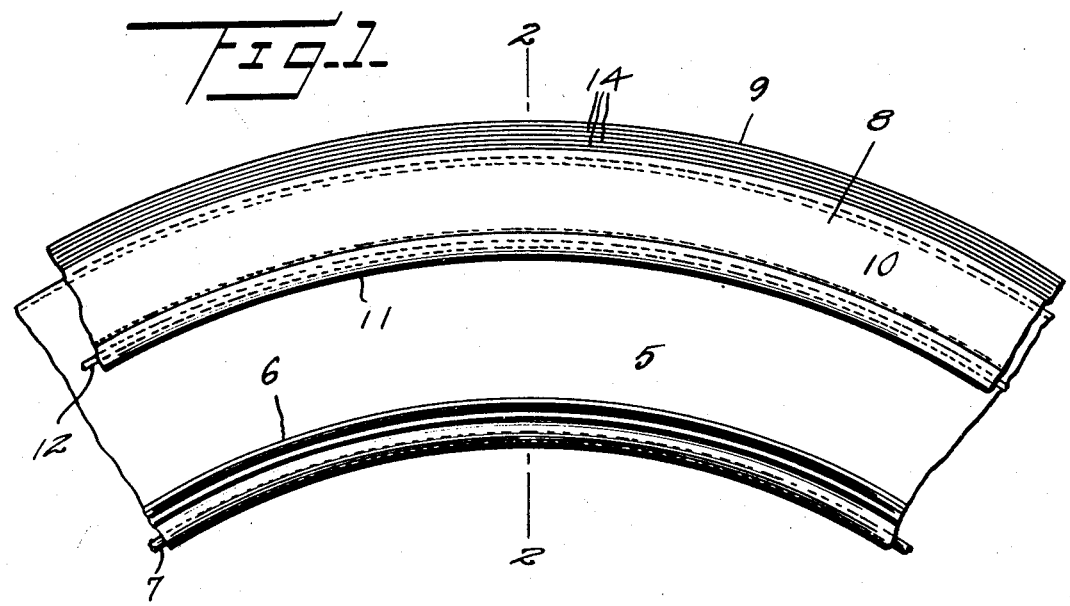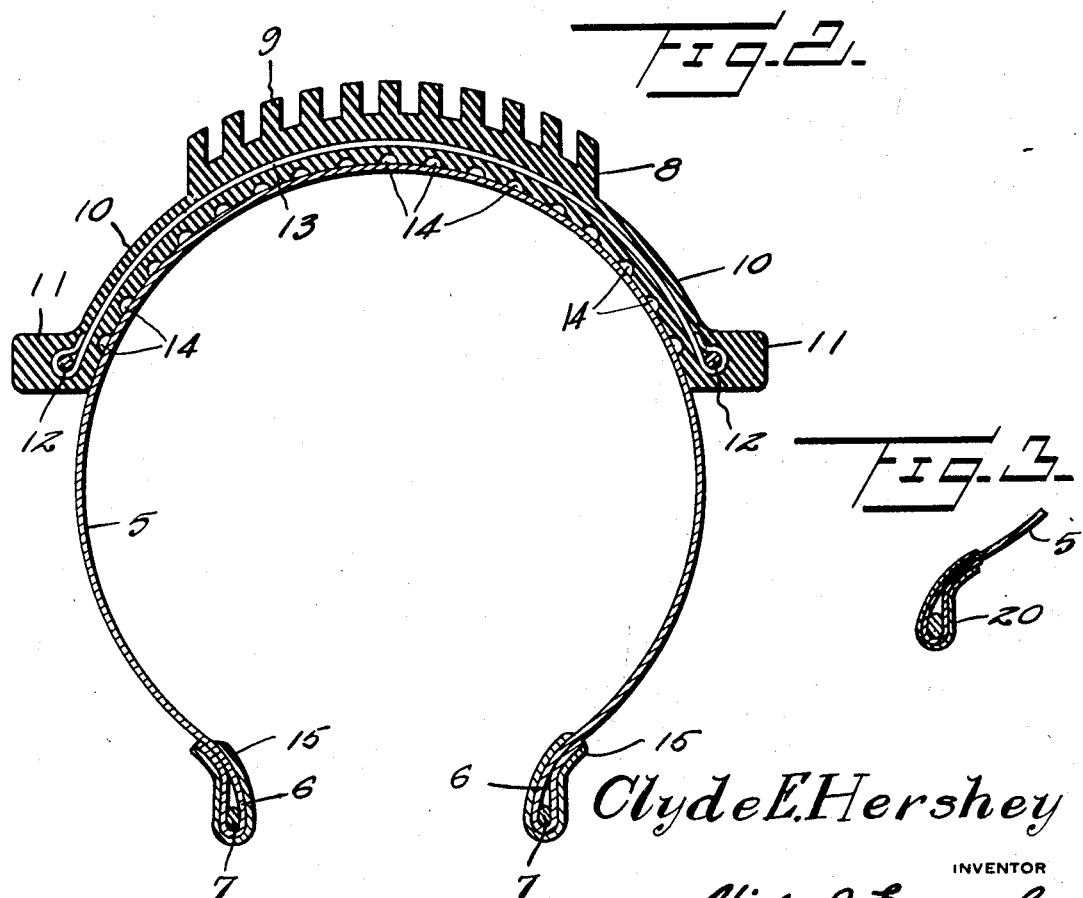

2,142,315

UNITED STATES PATENT OFFICE 2,142,315

TIRE

Clyde E. Hershey, Findlay, Ohio

Application July 12, 1937, Serial No. 153,274

2 Claims. (Cl. 152—189)

This invention relates to tires and more particularly to tire structures adapted for use in connection with motor vehicles and the like.

One of the principal objects of my invention is to provide a tire structure wherein the tread may be readily replaced on the casing, the casing being formed of puncture-proof material.

Another object of my invention is to provide a tire structure of the above described character which is economical in manufacture, simple in assembly and durable in use.

Other objects and advantages will be apparent from the following description, appended claims and annexed drawing.

Referring to the drawing wherein like reference characters designate like parts throughout the several views:

Fig. 1 is a side elevation of a section of an automobile tire constructed in accordance with the invention.

Fig. 2 is an enlarged sectional view taken on the line 2—2 of Fig. 1.

Fig. 3 is a detail sectional view illustrating a form of lubricating means secured to a section of the casing.

In practicing my invention I employ a tire casing 5 constructed of flexible material, for instance a steel alloy, and of a configuration substantially that of ordinary tire casings. The rim engaging sections of the casing are formed with loops 6 and are provided with coextending rings 7. Mounted on the outer periphery of the casing 5 is a tread 8 constructed of pliable or yieldable material, preferably rubber. The tread is formed of an intermediate section 9 of a design adapted for engagement with road surfaces and with laterally extending sections 10. The laterally extending sections 10 are fashioned with circumferentially extending flanges 11 having molded therein core members 12, preferably rings constructed of metal. A suitable cord of non-stretchable material constituting a tie member 13 is molded in the tread and connects the core members together, as illustrated in Fig. 2. A sufficient number of the tie members are employed to form, together with the rings 12, a fabricated structure within the tread. The inner face of the tread is provided with a plurality of recesses 14 forming vacuum cups which coact with the casing, as heretofore described.

Obviously, when the tread is applied to the outer periphery of the casing, the flexing action imparted to the tire in traveling over the ground will cause the casing 5 and tread 8 to coact together in a manner to form a vacuum within the cups and thereby secure the tread to the casing.

The fabricated structure, comprising the rings 12 and tie members 13, serves to prevent dislodgment of the tread laterally of the casing while the vacuum means prevents a creeping action in the circumferential as well as in the lateral direction. The casing is maintained in normal operating condition by means of an inflated inner tube (not shown) of ordinary construction.

To protect the tube inside the casing and absorb the wear between the rim and tire caused by friction, the lower ends of the casing are provided with U-shaped friction flaps 15. These flaps completely cover the rim engaging section of the casing on both the in and outsides thereof.

As illustrated in Fig. 3, the loop sections 6 may have connected thereto a suitable lubricating means, for instance a strip of felt 20 saturated with grease, to prevent wear and noise upon relative movement between the casing and a wheel rim.

It is to be distinctly understood that various changes and modifications in construction and arrangement of parts may be resorted to without departing from the spirt of the invention or scope of the appended claims.

Having described my invention, what I claim is:

1. In a tire structure, a flexible metal casing fashioned with loop sections adapted for engagement with a wheel rim, circumferentially extending rings within said loop sections, lubricating means about said loop sections, and a rubber tread secured to the outer periphery of said casing.

2. In a tire structure, a flexible metal casing having spaced ends fashioned with loop sections adapted for engagement with a wheel rim, a rubber tread formed on the inner face thereof with recesses coacting with the outer periphery of said casing to secure said tread to said casing, said tread fashioned with lateral sections engaging said casing and having circumferentially extending flanges, core members embedded within said flanges and extending circumferentially therewith, a plurality of tie members extending transversely through said tread above said recesses and connecting said core members together whereby said flanges are maintained in substantially spaced relation when said tread is compressed by engagement with a road surface, circumferentially extending rings within said loop sections, and lubricant saturated circumferentially extending members embracing said loop sections whereby to protect said loop sections from wear occasioned by engagement with the rim of a wheel on which the tire structure is carried.

CLYDE E. HERSHEY.